(12) United States Patent
Iwata et al.

(10) Patent No.: US 8,625,307 B2
(45) Date of Patent: Jan. 7, 2014

(54) DC TO AC POWER CONVERTING APPARATUS

(75) Inventors: Akihiko Iwata, Tokyo (JP); Hiroshi Ito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 300 days.

(21) Appl. No.: 13/127,132

(22) PCT Filed: Nov. 11, 2009

(86) PCT No.: PCT/JP2009/006015
§ 371 (c)(1),
(2), (4) Date: May 2, 2011

(87) PCT Pub. No.: WO2010/058536
PCT Pub. Date: May 27, 2010

(65) Prior Publication Data
US 2011/0211381 A1 Sep. 1, 2011

(30) Foreign Application Priority Data
Nov. 18, 2008 (JP) .................................. 2008-294257

(51) Int. Cl.
*H02M 1/12* (2006.01)
*H02M 1/14* (2006.01)

(52) U.S. Cl.
USPC ............... 363/17; 363/40; 363/41; 363/95; 363/98; 363/131; 363/132

(58) Field of Classification Search
USPC ............. 363/17, 40, 41, 95, 98, 131, 132
See application file for complete search history.

(56) References Cited

U.S. PATENT DOCUMENTS 7,355,869 B2 *  4/2008  Okamura ..................... 363/132
2008/0220298 A1 *  9/2008  Ishikawa et al. ............ 429/22

(Continued)

FOREIGN PATENT DOCUMENTS

JP    2002 165461    6/2002
JP    2006 81362     3/2006

(Continued)

OTHER PUBLICATIONS

International Search Report issued Feb. 16, 2010 in PCT/JP09/006015 filed Nov. 11, 2009.

(Continued)

*Primary Examiner* — Bao Q Vu
(74) *Attorney, Agent, or Firm* — Oblon, Spivak, McClelland, Maier & Neustadt, L.L.P.

(57) ABSTRACT

A neutral point clamped three-phase three-level inverter is connected to a first DC power supply and single-phase inverters are connected in series with AC output lines of individual phases of the three-phase three-level inverter such that sums of output voltages of the three-phase three-level inverter and output voltages of the respective single-phase inverters are output to a load through a smoothing filter. An output control unit controls the three-phase three-level inverter so that the individual phases of the three-phase three-level inverter output primary voltage pulses at a rate of one pulse per half cycle and controls the individual single-phase inverters by PWM, so that output voltages to the individual phases of the load form sine waves of which phases are offset by $2\pi/3$ from one phase to another, the sine waves having the same peak value.

13 Claims, 17 Drawing Sheets

(56) References Cited

U.S. PATENT DOCUMENTS

| | | |
|---|---|---|
| 2009/0116268 A1* | 5/2009 | Kishida et al. .................. 363/68 |
| 2010/0014335 A1 | 1/2010 | Iwata et al. |
| 2011/0128763 A1 | 6/2011 | Iwata et al. |

FOREIGN PATENT DOCUMENTS

| | | |
|---|---|---|
| JP | 2007 37355 | 2/2007 |
| JP | 2007 169730 | 7/2007 |
| JP | 2008 92651 | 4/2008 |
| JP | 2008 278560 | 11/2008 |
| WO | 2008 102551 | 8/2008 |
| WO | 2008 102552 | 8/2008 |

OTHER PUBLICATIONS

Office Action issued on Jun. 26, 2012 in the corresponding Japanese Patent Application No. 2010-539128 (with Partial English Translation).

Office Action mailed Jun. 3, 2013, in Chinese Patent Application No. 200980146061.6 (with English language translation).

* cited by examiner

DC TO AC POWER CONVERTING APPARATUS

TECHNICAL FIELD

The present invention relates to a power converting apparatus which converts DC power into AC power and, in particular, the invention is concerned with a power converting apparatus which converts DC power fed from a DC power supply like a solar battery having a stray electrostatic capacitance into AC power with three-phase outputs and outputs the AC power to a load.

BACKGROUND ART

Among conventional power converting apparatuses, there exists a below-mentioned power converting apparatus for photovoltaic power generation that converts DC power fed from a solar battery into AC power with three-phase outputs and delivers the AC power to a three-phase power system whose one phase is grounded with the power converting apparatus interconnected with the power system.

The power converting apparatus is provided with 3 sets of half-bridge inverters which are connected between output terminals of the solar battery, each half-bridge inverter being made up of two series-connected switching devices, single-phase inverters connected in series with AC output lines of the individual half-bridge inverters, and two series-connected capacitors for dividing a voltage of the solar battery, wherein output terminals of the single-phase inverters are connected to individual phases of the three-phase power system. The half-bridge inverters are operated at a rate of one pulse per half cycle and the individual single-phase inverters are controlled by pulse width modulation (PWM) so as to compensate for voltage insufficiencies with respect to a system voltage, whereby the power converting apparatus outputs the sums of outputs of the half-bridge inverters and the respective single-phase inverters. For this reason, it is possible to reduce an input DC voltage of the half-bridge inverters and a high voltage is not necessary to perform PWM control operation. Additionally, it is possible to reduce switching losses and lower the capacity of an output filter (refer to Patent Document 1, for example).

PRIOR ART DOCUMENT

Patent Document

Patent Document 1: International publication No. 2008-102552

SUMMARY OF THE INVENTION

Problems to be Solved by the Invention

Since a conventional power converting apparatus like the one mentioned above utilizes three-phase 2-level inverters as inverters connected to a solar battery, a bus line potential of a DC power supply fluctuates during operation of the inverters. On the other hand, a power system has a wiring for grounding a V phase or a neutral point and, therefore, if fluctuation occurs in the bus line potential of the DC power supply, there occurs a zero-phase-sequence current which flows through a stray electrostatic capacitance and a grounding point of the power system owing to the stray electrostatic capacitance of the DC power supply and potential fluctuation thereof. One problem that might occur has been that an earth leakage breaker operates due to the zero-phase-sequence current, causing the apparatus to stop operating.

The present invention has been made to solve the aforementioned problem. Accordingly, it is an object of the invention to provide a power converting apparatus featuring a compact and low-cost system configuration as well as high conversion efficiency and having capabilities to suppress a zero-phase-sequence currant which may potentially flow through a stray electrostatic capacitance of a DC power supply and prevent malfunction of an earth leakage breaker.

Means for Solving the Problems

A power converting apparatus according to the present invention includes a three-phase three-level inverter connected between positive and negative terminals of a first DC power supply, one or a plurality of single-phase inverters which are connected in series with an AC output line of each phase of the three-phase three-level inverter, and a control device, the power converting apparatus being configured such that the sums of output voltages of the three-phase three-level inverter and output voltages of the respective single-phase inverters are output to a load through a smoothing filter. A voltage of second DC power supplies which are DC input power supplies of the single-phase inverters is lower than a one-level voltage of the three-phase three-level inverter. Also, the control device controls the three-phase three-level inverter in such a manner that each phase of the three-phase three-level inverter outputs a voltage at a rate of one pulse per half cycle of an output voltage to a corresponding phase of the load as a primary voltage pulse, and the control device controls the individual single-phase inverters by PWM so that output voltages supplied to individual phases of the load form sine waves of which phases are offset by $2\pi/3$ from one phase to another, the sine waves having the same peak value, and the output voltages supplied to the individual phases of the load being referenced to a point having a zero DC potential or a fixed DC potential with respect to a reference potential of the first DC power supply.

Advantageous Effects of the Invention

The power converting apparatus according to the present invention can perform with high accuracy an operation for controlling output voltages forming sine waves of which phases are offset by $2\pi/3$ from one phase to another, the sine waves having the same peak value, wherein the output voltages are referenced to a specific DC potential point of the first DC power supply so that fluctuations of a bus line potential of the first DC power supply can be eliminated. For this reason, it is possible to make an apparatus configuration which produces no AC component between a neutral potential of a three-phase output and one of potentials the first DC power supply and, thus, it is possible to suppress a zero-phase-sequence current flowing through a stray electrostatic capacitance of the first DC power supply.

Also, since the power converting apparatus outputs voltages by combination of the three-phase three-level inverter and the single-phase inverters, the three-phase three-level inverter may be of a type having a low input DC voltage and it is not necessary to perform PWM control operation with a high voltage. For this reason, the power converting apparatus is constructed to have a compact and low-cost system configuration as well as high conversion efficiency.

BEST MODES FOR CARRYING OUT THE INVENTION

First Embodiment

A power converting apparatus according to a first embodiment of the present invention is now described with reference to the drawings.

Figure 1:
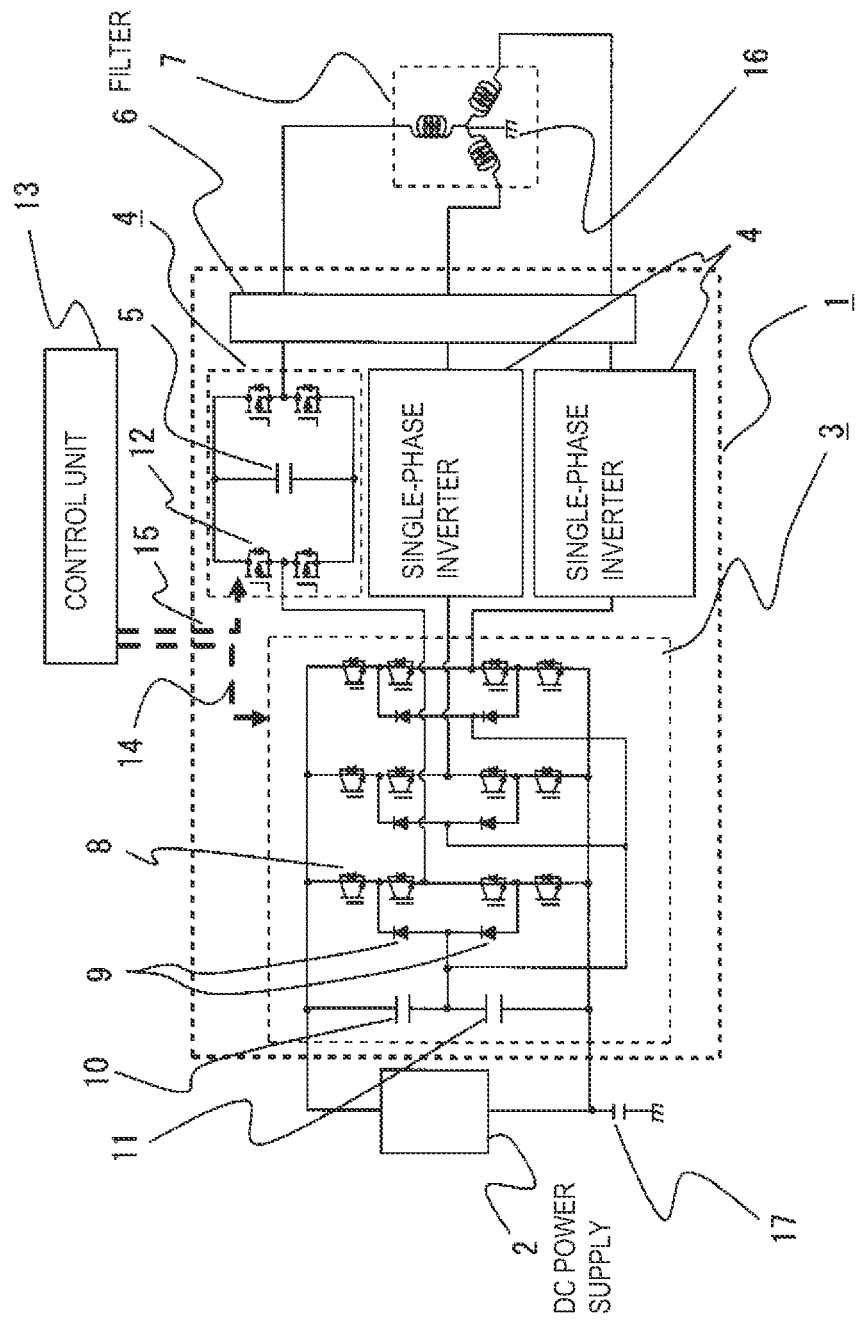
FIG. 1 is a diagram illustrating the configuration of a power converting apparatus according to a first embodiment of the present invention.

FIG. 1 is a diagram illustrating the configuration of the power converting apparatus according to the first embodiment of this invention. The power converting apparatus is provided with a three-phase inverter circuit 1 constituting a main circuit and an output control unit 13. The three-phase inverter circuit 1 is for converting DC power fed from a first DC power supply 2 and into three-phase AC power and outputting the same to a load 7, the first DC power supply 2 being a DC power supply like a solar battery having a stray electrostatic capacitance 17 with respect to the ground. The load 7 is grounded at a load grounding point 16 thereof.

The three-phase inverter circuit 1 includes a three-phase three-level inverter 3 of which bus line voltage is a voltage of the first DC power supply 2, single-phase inverters 4 connected in series with AC output lines of individual phases of the three-phase three-level inverter 3, and a three-phase smoothing filter 6 connected to downstream stages of the single-phase inverters 4, the smoothing filter 6 being made up of reactors and capacitors which are not illustrated.

Each phase of the three-phase three-level inverter 3 is configured with four semiconductor switching devices 8 which are made up of insulated-gate bipolar transistors (IGBTs) or the like, each including diodes connected in reverse parallel, and two clamping diodes 9. Also, the three-phase three-level inverter 3 is provided with a first series-connected capacitor 10 and a second series-connected capacitor 11 as two series-connected capacitors for dividing the voltage of the first DC power supply 2, a junction point between the first series-connected capacitor 10 and the second series-connected capacitor 11 being connected to a junction point between the two clamping diodes 9 of each phase. This means that the junction point between the first series-connected capacitor 10 and the second series-connected capacitor 11 serves as a neutral point that is a potential point which divides the voltage of the first DC power supply 2 into two parts, so that a junction point between the two semiconductor switching devices 8 constituting upper and lower arms of each phase is clamped at a neutral point potential.

Each of the single-phase inverters 4 is provided with a full-bridge inverter 12 made up of four semiconductor switching devices and a DC capacitor 5 which serves as a second DC power supply for retaining a voltage. An output voltage of the single-phase inverter 4 of each phase is superimposed on an output voltage of each phase of the three-phase three-level inverter 3, and the sum of the output voltage of the three-phase three-level inverter 3 and the output voltage of each single-phase inverter 4 is output to the load 7 through the smoothing filter 6.

The voltage of the DC capacitor 5 of each single-phase inverter 4 is made lower compared to one half of the voltage of the first DC power supply 2 (or voltages of the first and second series-connected capacitors 10, 11). This means that the voltage of the DC capacitor 5 is lower than a one-level voltage of the three-phase three-level inverter 3. It is to be noted that FIG. 1 illustrates a circuit configuration of the single-phase inverter 4 of one phase only among the three single-phase inverters 4, omitting illustration of the other phases, for the sake of simplification.

The three-phase three-level inverter 3 and the single-phase inverters 4 are controllably driven by a three-phase three-level inverter control signal 14 and a single-phase inverter control signal 15 which are output from the output control unit 13 capable of performing mathematical operation by use of a central processing unit (CPU), a digital signal processor (DSP), a field-programmable gate array (FPGA), or the like.

Operation of the three-phase inverter circuit 1 thus configured is described below referring to voltage waveforms depicted in FIGS. 2 to 5. Individual potentials in the waveforms are potentials shown with reference to the neutral point, that is, the junction point between the first series-connected capacitor 10 and the second series-connected capacitor 11.

Figure 2:
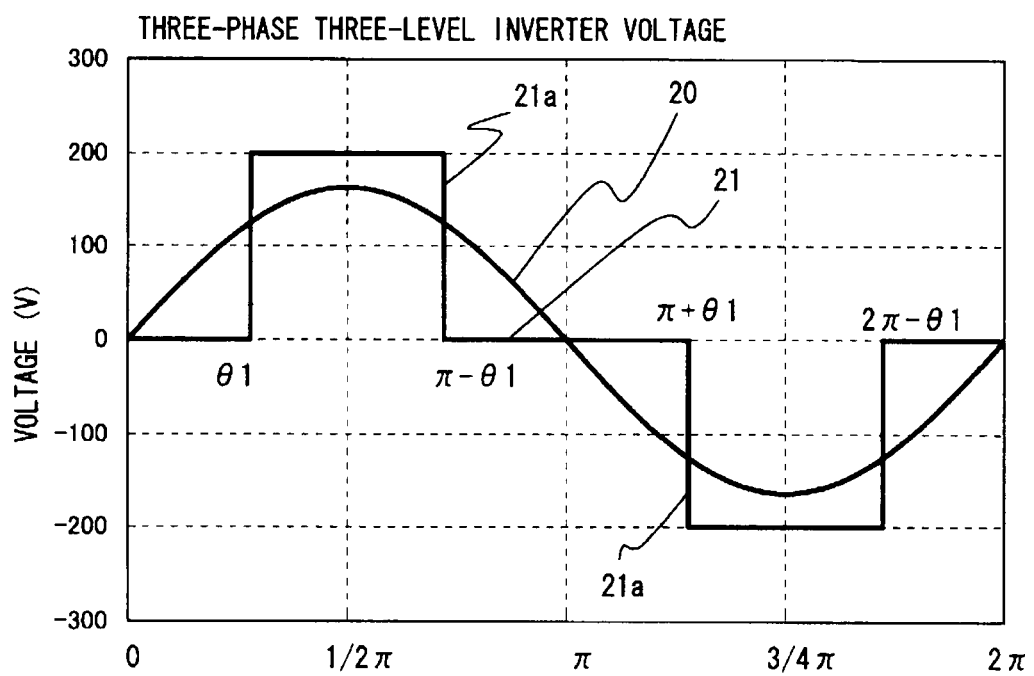
FIG. 2 is a voltage waveform diagram for explaining operation of a three-phase inverter circuit according to the first embodiment of the present invention.

FIG. 2 depicts a phase voltage command 20 which is a voltage command for one phase, e.g., a U phase, output from the three-phase inverter circuit 1 and a voltage waveform (three-phase three-level inverter voltage 21) output from the U phase of the three-phase three-level inverter 3. It is to be noted that the phase voltage commands 20 are sine waves of which phases are offset by 2π/3 from one phase to another, the sine waves having the same peak value.

The DC voltage output from the first DC power supply 2 is charged into a series circuit unit which is made up of the first series-connected capacitor 10 and the second series-connected capacitor 11. The voltages of the first DC power supply 2, the first series-connected capacitor 10 and the second series-connected capacitor 11 are detected and individually detected voltage values are transmitted to the output control unit 13.

Controlled by the three-phase three-level inverter control signal 14 fed from the output control unit 13, the individual phases of the three-phase three-level inverter 3 output voltage pulses, 200 V in this case, of which peak values correspond to the individual voltage values of the first series-connected capacitor 10 and the second series-connected capacitor 11 (or a voltage value corresponding to one half of the voltage of the first DC power supply 2) at a rate of one pulse per half cycle in response to the phase voltage commands 20 using the DC voltages of the first series-connected capacitor 10 and the second series-connected capacitor 11 as input voltages. These voltage pulses output at the rate of one pulse per half cycle are hereinafter referred to as primary voltage pulses 21a. Here, the primary voltage pulses 21a are output one pulse in a positive-going side of the phase voltage command 20 and one pulse in a negative-going side of the phase voltage command 20 during one complete cycle of the phase voltage command 20. While the primary voltage pulses 21a are output in such a fashion that a power balance during half cycle (or one cycle) of the single-phase inverters 4 becomes zero, a detailed description of this control operation will be given at a later time.

Figure 3:
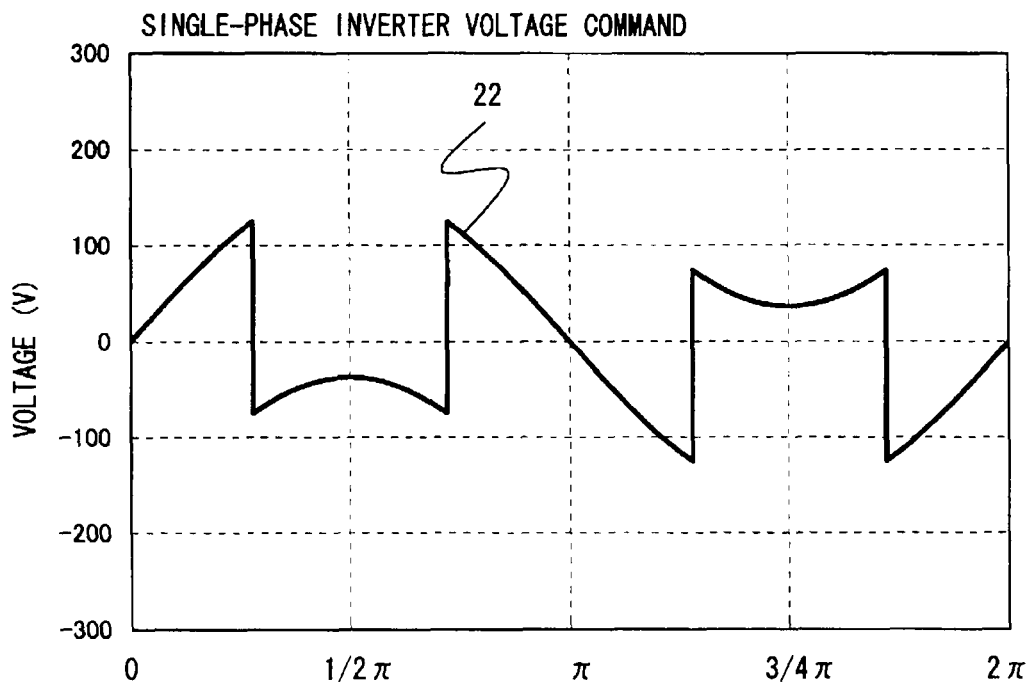
FIG. 3 is a voltage waveform diagram for explaining the operation of the three-phase inverter circuit according to the first embodiment of the present invention.

FIG. 3 depicts an output voltage command (single-phase inverter voltage command 22) given to each single-phase inverter 4. The single-phase inverter voltage command 22 is obtained by subtracting the three-phase three-level inverter voltage 21 of each phase from the phase voltage command 20 given to the three-phase inverter circuit 1. Controlled by the single-phase inverter control signal 15 fed from the output control unit 13, the individual single-phase inverters 4 output voltages after high-frequency PWM control operation performed in such a manner as to compensate for differences between the phase voltage commands 20 given to the three-phase inverter circuit 1 and output voltages of the respective phases of the three-phase three-level inverter 3. In this PWM control operation, the individual single-phase inverters 4 are controlled such that output currents supplied to the individual phases of the load 7 become sine waves.

Figure 4:
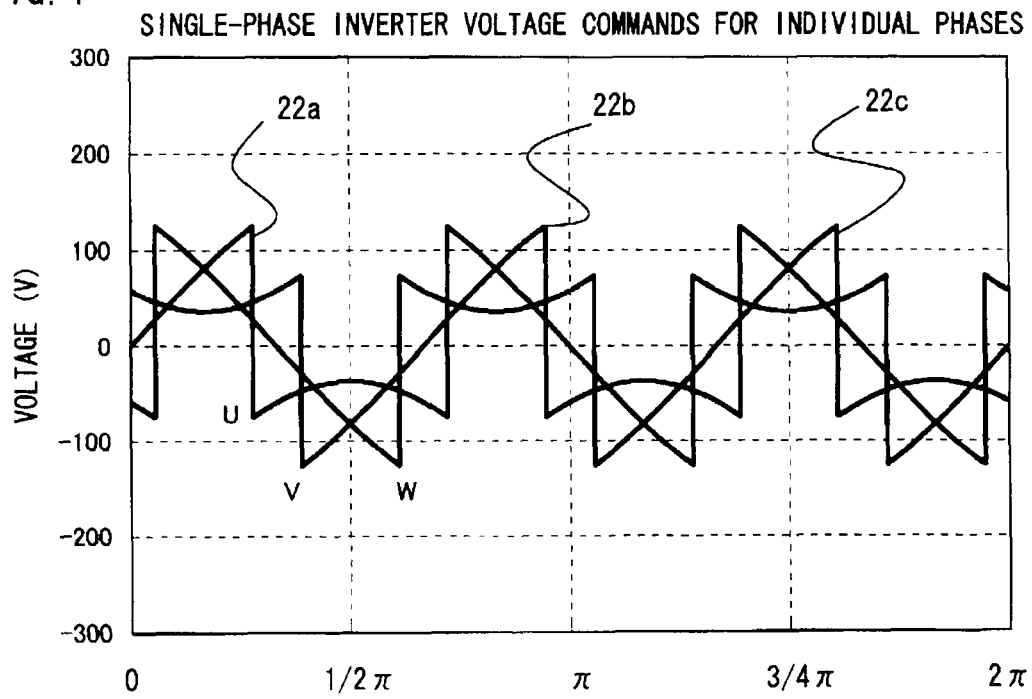
FIG. 4 is a voltage waveform diagram for explaining the operation of the three-phase inverter circuit according to the first embodiment of the present invention.

FIG. 4 depicts single-phase inverter voltage commands for the single-phase inverters 4 of the individual phases, wherein designated by 22a is a U-phase single-phase inverter voltage command, designated by 22b is a V-phase single-phase inverter voltage command and designated by 22c is a W-phase single-phase inverter voltage command. In this case, a peak value of each waveform is ±125 V and it is necessary that a bus line voltage of each single-phase inverter 4 be equal to or higher than 125 V in order to output voltages according to these voltage commands.

Figure 5:
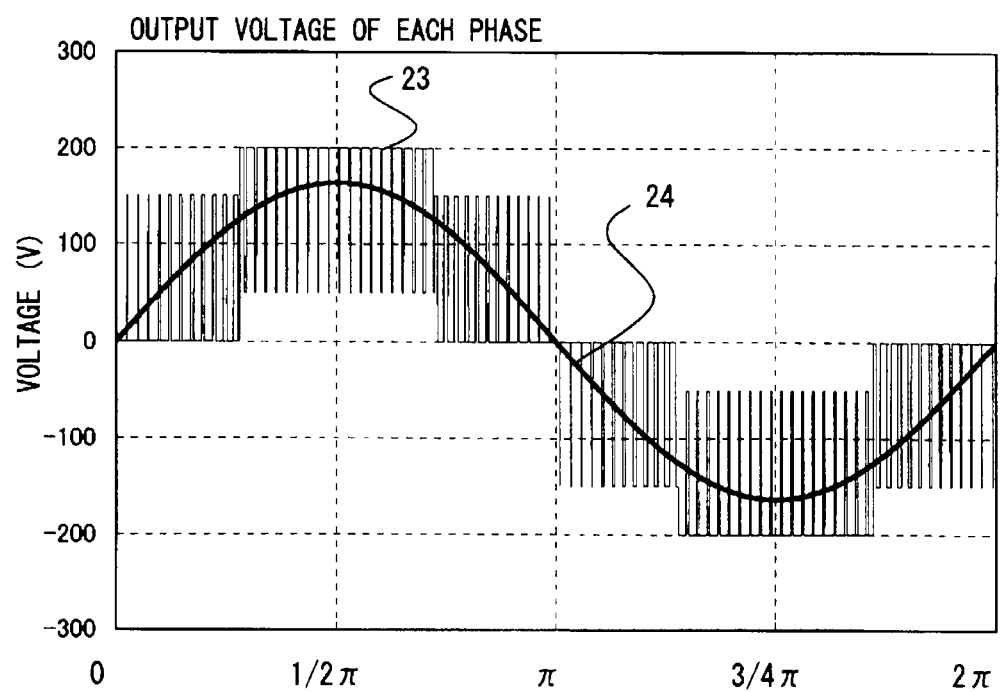
FIG. 5 is a voltage waveform diagram for explaining the operation of the three-phase inverter circuit according to the first embodiment of the present invention.

Output voltages of the single-phase inverters 4 of the individual phases are superimposed on the output voltages of the respective phases of the three-phase three-level inverter 3, and the sum of the output voltage of the three-phase three-level inverter 3 and the output voltage of each single-phase inverter 4 is output to the load 7 through the smoothing filter 6. FIG. 5 depicts an output voltage of each phase of the three-phase inverter circuit 1 that is the sum of the output voltage of the three-phase three-level inverter 3 and the output voltage of each single-phase inverter 4. Designated by 23 is the output voltage of each phase and designated by 24 is an averaged voltage waveform of the output voltage 23 of each phase.

The output voltage waveform 24 of each phase supplied to the load 7 forms a voltage waveform similar to the phase voltage command 20 for each phase, which means that the voltage waveforms 24 form sine waves of which phases are offset by 2π/3 from one phase to another, the sine waves having the same peak value, and the voltage waveforms 24 being referenced to the potential of the neutral point, that is, the junction point between the first series-connected capacitor 10 and the second series-connected capacitor 11.

Next, operation for controlling output of the primary voltage pulses 21a of the three-phase three-level inverter 3 and the power balance of the single-phase inverters 4 are described below with reference to FIG. 2.

As mentioned in the foregoing, the primary voltage pulses 21a are output in such a fashion that the power balance during half cycle or one cycle of the single-phase inverters 4 becomes zero. Since the single-phase inverters 4 output the voltages in such a manner as to compensate for the differences between the phase voltage commands 20 and the output voltages of the respective phases of the three-phase three-level inverter 3, the three-phase three-level inverter 3 may output such electric power that is equivalent to electric power output in accordance with the phase voltage commands 20.

In a case where the power converting apparatus is controlled in such a manner that the phases of the output currents coincide with the phases of the output voltages (operation at power factor 1), Vp can be expressed by equation (1) below wherein Vp denotes a peak voltage of the phase voltage commands 20 and Ed denotes one half of a DC voltage input into the three-phase inverter circuit 1 (which is the voltage of the first DC power supply 2 or the sum of the voltage of the first series-connected capacitor 10 and the voltage of the second series-connected capacitor 11 in this example). It is to be noted that θ1 (0<θ1<π/2) is a phase corresponding to a leading edge of each primary voltage pulse 21a.

[Equation 1]

$$Vp = 4 \times \frac{1}{\pi} \int_{\theta 1}^{\frac{\pi}{2}} Ed \times \sin\theta \, d\theta \qquad (1)$$
$$= \frac{4Ed}{\pi} \times \cos\theta 1$$

From equation (1) above, the phase θ1 corresponding to the leading edge of each primary voltage pulse 21a can be expressed by equation (2) below:

[Equation 2]

$$\theta 1 = \cos^{-1}\left(\frac{\pi \cdot Vp}{4 \cdot Ed}\right) \qquad (2)$$

Voltage pulses having a pulse width (π−2θ1) that rise or fall at phases (nπ+θ1) as calculated in the aforementioned manner constitute the primary voltage pulses 21a. Upon performing the aforementioned mathematical operation, the output control unit 13 transmits the three-phase three-level inverter control signal 14 obtained on the ground of calculation results and thereby control outputs of the three-phase three-level inverter 3. While the phase θ1 corresponding to the leading edge of each primary voltage pulse 21a is calculated by the aforementioned mathematical operation, determining this phase θ1 is identical to determining the pulse width (π−2θ1).

The present embodiment employs the three-phase three-level inverter 3 as an inverter connected to the first DC power supply 2 to control the entire three-phase inverter circuit 1 so that the three-phase inverter circuit 1 outputs sine waves of which phases are offset by 2π/3 from one phase to another, the sine waves having the same peak value, and the output voltages being referenced to the potential of the neutral point, that is, the junction point between the first series-connected capacitor 10 and the second series-connected capacitor 11. In this kind of configuration, the potential of the neutral point is stabilized and there is no fluctuation in a bus line potential of the first DC power supply 2. Thus, it is possible to perform an output voltage control operation whereby a desired voltage waveform is obtained with high accuracy and the sum of the output voltages of the three phases becomes zero. For this reason, there is no AC component between the neutral point potential of the three-phase outputs and the potential of one side of the first DC power supply 2 and, therefore, it is possible to suppress a zero-phase-sequence current which may flow through the stray electrostatic capacitance 17 of the first DC power supply 2. The zero-phase-sequence current is normally detected as a leakage current flowing through a earth leakage breaker which is disposed in an upstream stage of the load 7. Since the zero-phase-sequence current can be suppressed, however, it is possible to prevent malfunction of the earth leakage breaker and, in addition, power conversion efficiency of the three-phase inverter circuit 1 can be improved because the leakage current can be reduced.

Also, since the three-phase inverter circuit 1 outputs voltages obtained by adding the output voltages of the three-phase three-level inverter 3 and the output voltages of the respective single-phase inverters 4, the three-phase inverter circuit 1 can output voltages higher than the voltage of the first DC power supply 2 which is the DC input voltage of the three-phase inverter circuit 1. Additionally, since each phase of the three-phase three-level inverter 3 is operated to produce one pulse per half cycle, there occurs almost no switching loss. Since DC voltages of the single-phase inverters 4 which are controlled by PWM at a high frequency are set at a relatively small value, switching losses caused by the PWM control operation are small and, thus, the smoothing filter 6 may be of a type having a small capacity. For this reason, the three-phase inverter circuit 1 may be produced to have a system configuration which is compact and low-cost, yet featuring high conversion efficiency.

Moreover, since the three-phase inverter circuit 1 is controlled in such a fashion that the power balance during half cycle or one cycle of the individual single-phase inverters 4 becomes zero, it is possible to achieve a simple configuration in which the DC capacitor 5 of each single-phase inverter 4 does not have a DC power supply for transmitting and receiving electric power to and from the outside.

Second Embodiment

While the three-phase three-level inverter 3 is configured to determine the pulse width (or the phase of the leading edge) of the primary voltage pulse 21a so as to output electric power that is equivalent to electric power output in response to the phase voltage commands 20 with the aid of the primary voltage pulses 21a in the above-described first embodiment, it is possible to determine the pulse width by another method. In the present embodiment, the pulse width of the primary voltage pulse 21a is determined by calculating a watt-hour value per half cycle or one cycle of the single-phase inverters 4 and ensuring that the calculated watt-hour value becomes zero.

Figure 6:
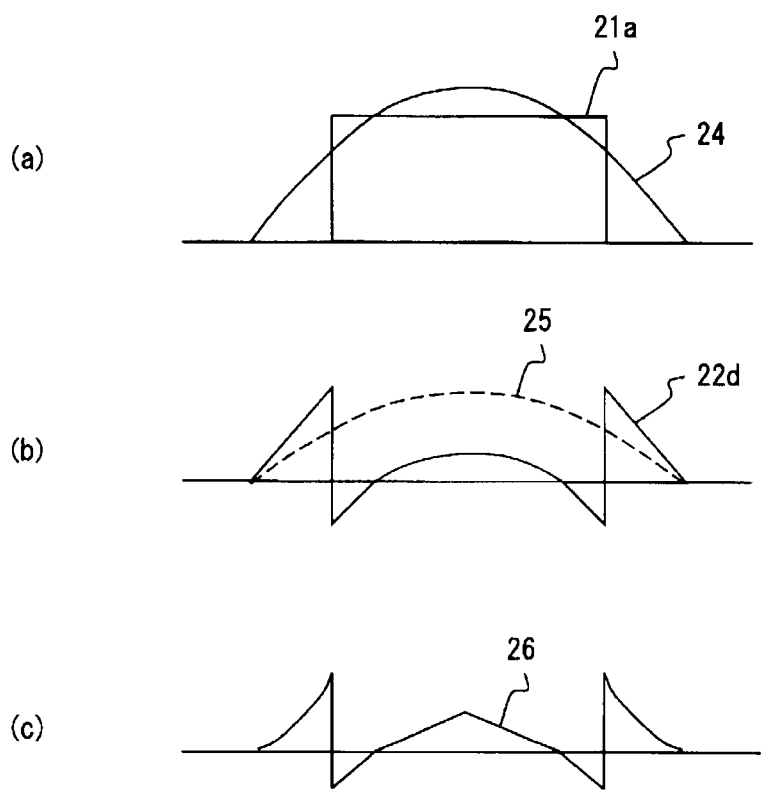
FIG. 6 is a waveform diagram for explaining operation of a three-phase inverter circuit according to a second embodiment of the present invention.
Figure 7:
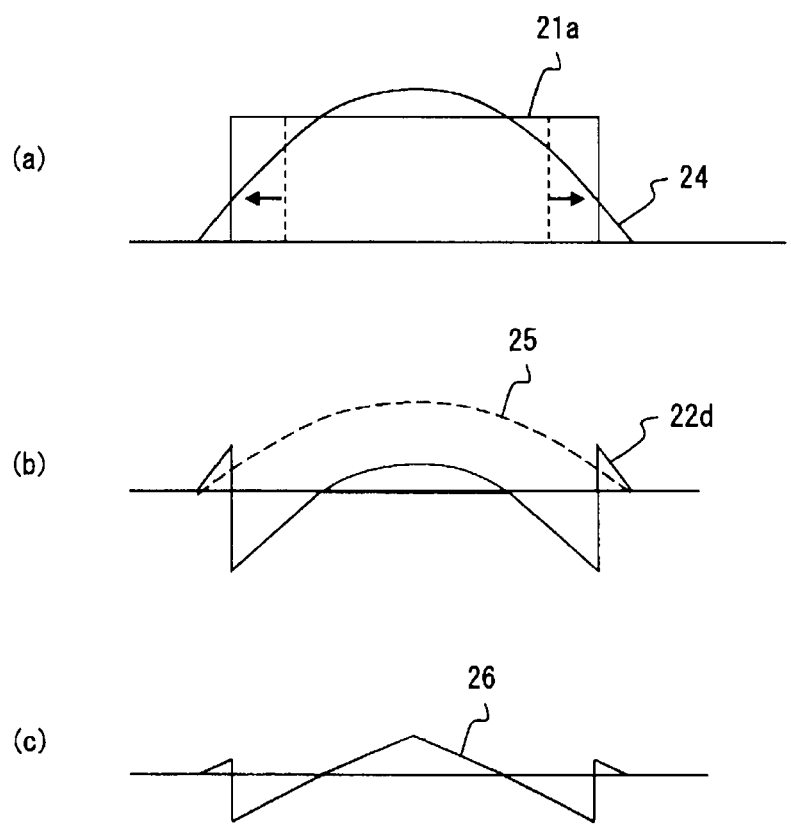
FIG. 7 is a waveform diagram for explaining the operation of the three-phase inverter circuit according to the second embodiment of the present invention.

A relationship between the pulse width of the primary voltage pulses 21a output from the three-phase three-level inverter 3 and output power of the single-phase inverters 4 is described below with reference to FIGS. 6 and 7. FIG. 6 depicts a case of a comparative example in which the watt-hour value per half cycle of the single-phase inverters 4 is positive and FIG. 7 depicts a case in which the pulse width of each primary voltage pulse 21a is broadened as compared to the case of FIG. 6 and the watt-hour value per half cycle of the single-phase inverters 4 is made equal to 0. For the sake of explanation, the Figures depict waveforms per half cycle only.

As depicted in FIGS. 6(a) and 7(a), the three-phase three-level inverter 3 outputs the primary voltage pulses 21a at a rate of one pulse per half cycle in one-to-one correspondence with output voltage waveforms 24 of individual phases of the three-phase inverter circuit 1.

Then, as depicted in FIGS. 6(b) and 7(b), each of the single-phase inverters 4 outputs an average voltage 22d by performing PWM control operation so that a voltage waveform corresponding to the difference between the primary voltage pulse 21a of the three-phase three-level inverter 3 and the output voltage waveform 24 of each phase is obtained. For example, if the three-phase three-level inverter 3 is a photovoltaic power conditioner, it is often the case that output currents to the load 7 are supplied at power factor 1. In the case of power factor 1, a current waveform of each output current 25 becomes a sine wave having the same phase as the output voltage waveform 24 of each phase.

Then, output power 26 of each single-phase inverter 4 that is the product of the output voltage 22d and the output current 25 has waveforms as shown in FIGS. 6(c) and 7(c). Since the watt-hour value per half cycle of the output power 26 of each single-phase inverter 4 becomes positive as depicted in FIG. 6(c), it is necessary to externally provide a power supply for the DC capacitor 5 of each single-phase inverter 4. As depicted in FIG. 7(c), the pulse width of each primary voltage pulse 21a is broadened and, in this case, negative parts of the output power 26 of each single-phase inverter 4 increase so that the watt-hour value per half cycle becomes zero.

In this embodiment, the pulse width of each primary voltage pulse 21a is determined such that the watt-hour value per half cycle or one cycle of the single-phase inverters 4 becomes zero. Since the three-phase inverter circuit 1 is controlled in such a fashion that the power balance during half cycle or one cycle of the individual single-phase inverters 4 becomes zero, it is possible to achieve a simple configuration in which the DC capacitor 5 of each single-phase inverter 4 does not have a DC power supply for transmitting and receiving electric power to and from the outside.

Third Embodiment

In the foregoing first and second embodiments, the pulse width of each primary voltage pulse 21a is determined such that the watt-hour value per half cycle or one cycle of the single-phase inverters 4 becomes zero. In the present embodiment, an arrangement for performing fine adjustment of the primary voltage pulses 21a is described.

In this case, there are provided voltage detectors 32 (refer to FIG. 10) for measuring voltages of the DC capacitors 5 of the individual single-phase inverters 4.

First, as in the foregoing first and second embodiments, the pulse width of each primary voltage pulse 21a is determined such that the watt-hour value per half cycle or one cycle of the single-phase inverters 4 becomes zero to thereby control outputs of the three-phase inverter circuit 1. If a power balance of any one of the single-phase inverters 4 is disrupted by one cause or another, such as a sudden change in an input DC voltage or a sudden change in the load 7 during this output control operation, the voltage of the DC capacitor 5 of the relevant single-phase inverter 4 fluctuates.

The individual voltage detectors 32 detect voltages of the DC capacitors 5 of the single-phase inverters 4 and voltage values of the individual DC capacitors 5 are transmitted to the output control unit 13. The output control unit 13 controls the three-phase three-level inverter 3 by shortening the pulse width of the primary voltage pulse 21a of a corresponding phase when the voltage value of any DC capacitor 5 is larger than a preset reference value, and by lengthening the pulse width when the voltage value is smaller than the reference value, so that the voltage values of the DC capacitors 5 become closer to the reference value.

As explained in the foregoing second embodiment, the watt-hour value per half cycle or one cycle of the single-phase inverter 4 increases when the pulse width of the primary voltage pulse 21a is shortened and decreases when the pulse width of the primary voltage pulse 21a is lengthened. Accordingly, when the voltage value of any of the DC capacitors 5 is larger than the reference value, the pulse width of the primary voltage pulse 21a of the corresponding phase is shortened to thereby increase the watt-hour value of the pertinent single-phase inverter 4 and thus decrease the voltage of the DC capacitor 5. Also, when the voltage value of any of the DC capacitors 5 is smaller than the reference value, the pulse width of the primary voltage pulse 21a of the corresponding phase is lengthened to thereby decrease the watt-hour value of the pertinent single-phase inverter 4 and thus increase the voltage of the DC capacitor 5.

The single-phase inverters 4 are controlled by feedback so that the voltage of the DC capacitor 5 of each single-phase inverter 4 matches the reference value by adjusting the pulse width of the primary voltage pulses 21a output from the three-phase three-level inverter 3 in the above-described fashion. This control operation makes it possible to control the power balance during half cycle or one cycle of the individual single-phase inverters 4 to become zero in a reliable fashion. For this reason, it is possible to prevent shortage of the output voltages of the single-phase inverters 4, overcharging of the DC capacitors 5, and insulation breakage of the single-phase inverters 4 caused by the overcharging, for instance, and this makes it possible to obtain a three-phase inverter circuit 1 whose outputs are stabilized.

Fourth Embodiment

Next, a power converting apparatus according to a fourth embodiment of the present invention is described with reference to the drawings.

Figure 8:
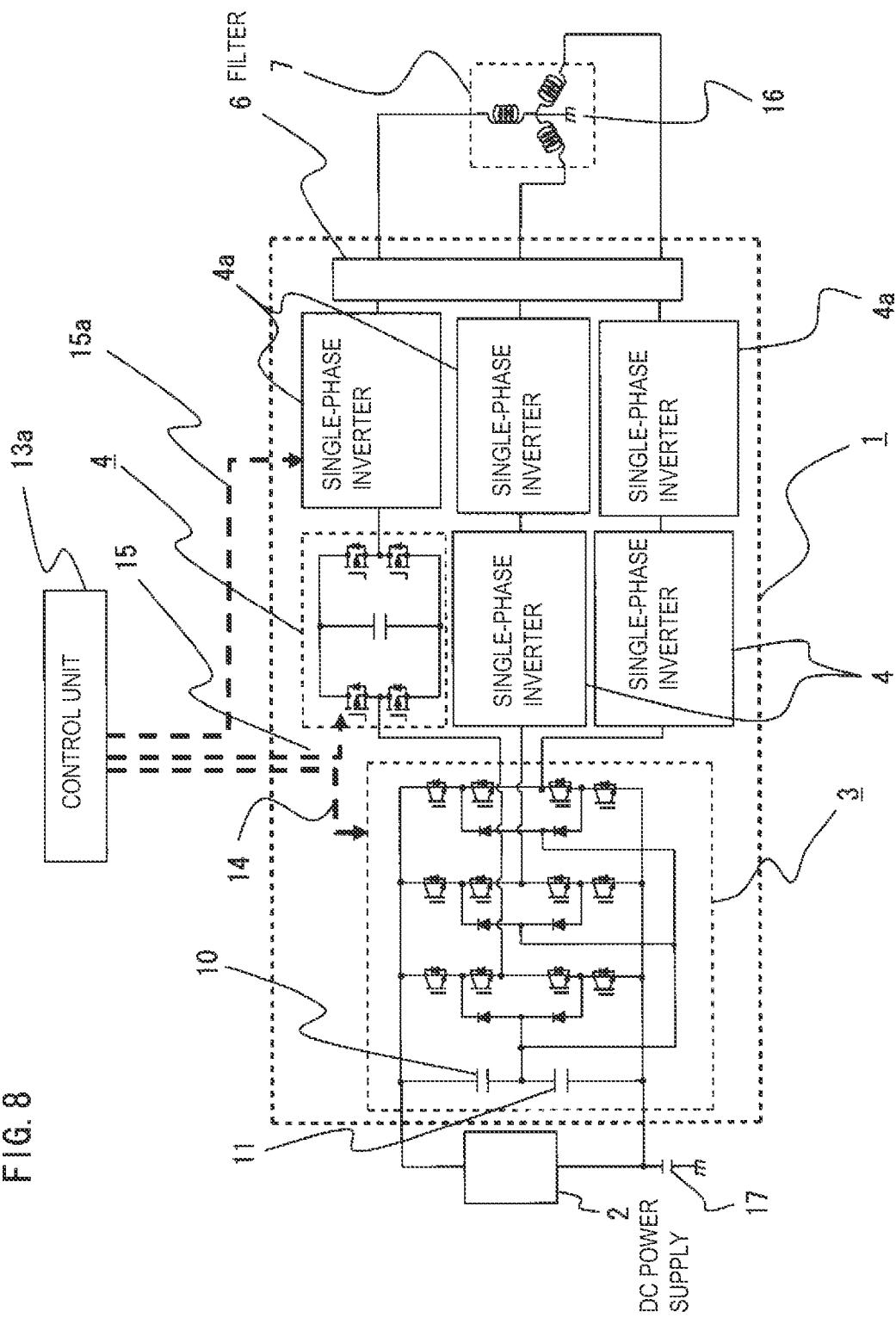
FIG. 8 is a diagram illustrating the configuration of a power converting apparatus according to a fourth embodiment of the present invention.

FIG. 8 is a diagram illustrating the configuration of the power converting apparatus according to the fourth embodiment of this invention. In a three-phase inverter circuit 1 of this embodiment, a plurality (two in this case) of single-phase inverters 4, 4a are connected in series with an AC output line of each phase of a three-phase three-level inverter 3. The two single-phase inverters 4, 4a provided for each phase have a like configuration and, thus, FIG. 8 illustrates the circuit configuration of one single-phase inverter 4 only, omitting illustration of the other single-phase inverter 4a, for the sake of simplification.

The three-phase three-level inverter 3 and the single-phase inverters 4, 4a are controllably driven by a three-phase three-level inverter control signal 14 and single-phase inverter control signals 15, 15a which are output from an output control unit 13a capable of performing mathematical operation by use of a CPU, a DSP, an FPGA, or the like.

The configuration of FIG. 8 is otherwise the same as the configuration of the foregoing first embodiment illustrated in FIG. 1.

Next, operation is described.

Individual phases of the three-phase three-level inverter 3 output primary voltage pulses 21a at a rate of one pulse per half cycle in response to respective phase voltage commands 20 in the same fashion as in the aforementioned first embodiment. Each of the primary voltage pulses 21a is output with the pulse width thereof determined in such a fashion that a power balance during half cycle (or one cycle) of the single-phase inverters 4 becomes zero.

The individual single-phase inverters 4, 4a output voltages after high-frequency PWM control operation performed in such a manner as to compensate for differences between the phase voltage commands 20 given to the three-phase inverter circuit 1 and output voltages of the respective phases of the three-phase three-level inverter 3. In this case, the difference between the phase voltage command 20 and the output voltage of each phase of the three-phase three-level inverter 3 is compensated for by the sum of the output voltages the two single-phase inverters 4, 4a of the relevant phase. In addition, the individual single-phase inverters 4, 4a are controlled such that output currents thereof become sine waves in this PWM control operation.

The output voltages the two single-phase inverters 4, 4a of the individual phases are superimposed on the output voltages of the respective phases of the three-phase three-level inverter 3, and the sum of the output voltage of the three-phase three-level inverter 3 and the output voltage of each pair of the single-phase inverters 4, 4a is output to the load 7 through the smoothing filter 6.

Figure 9:
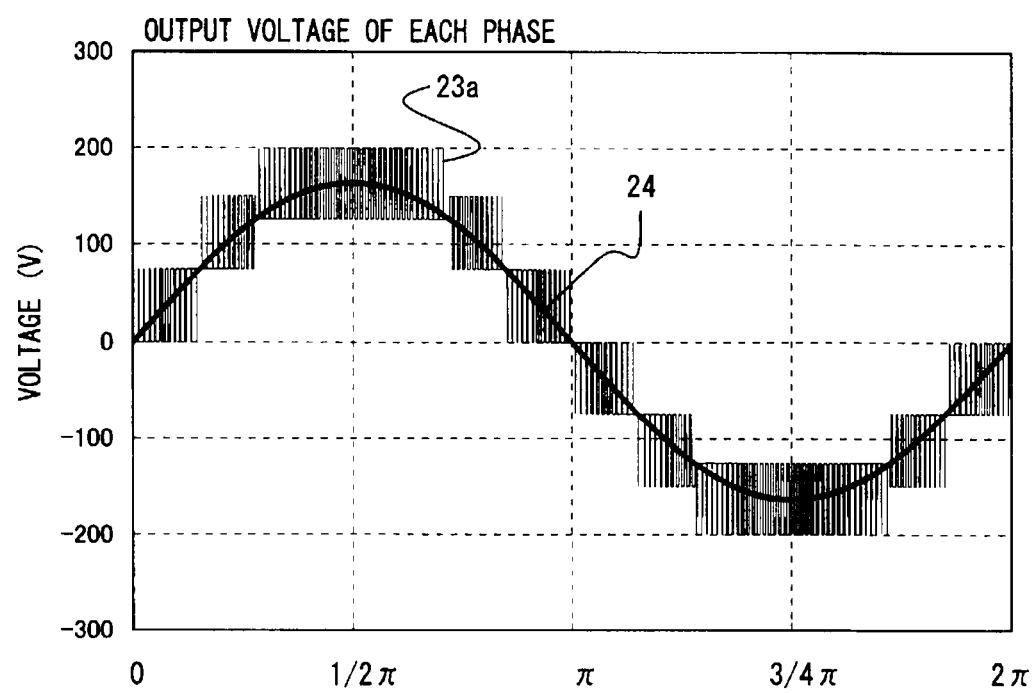
FIG. 9 is a voltage waveform diagram for explaining operation of a three-phase inverter circuit according to the fourth embodiment of the present invention.

FIG. 9 depicts an output voltage of each phase of the three-phase inverter circuit 1 that is the sum of the output voltage of the three-phase three-level inverter 3 and the output voltage of each pair of the single-phase inverters 4, 4a. Designated by 23a is the output voltage of each phase and designated by 24 is an averaged voltage waveform of the output voltage 23 of each phase. In this case, switching timings of the series-connected two single-phase inverters 4, 4a are offset by shifting phases of carrier waves by 180 degrees, for example.

As in the foregoing first embodiment, the output voltage waveform 24 of each phase supplied to the load 7 forms a voltage waveform similar to the phase voltage command 20 for each phase, which means that the voltage waveforms 24 form sine waves of which phases are offset by $2\pi/3$ from one phase to another, the sine waves having the same peak value, and the voltage waveforms 24 being referenced to the potential of the neutral point, that is, the junction point between the first series-connected capacitor 10 and the second series-connected capacitor 11.

The potential of the neutral point is stabilized and there is no fluctuation in a bus line potential of the first DC power supply 2 and, thus, it is possible to perform an output voltage control operation whereby a desired voltage waveform is obtained with high accuracy and the sum of the output voltages of the three phases becomes zero in the present embodiment too as in the foregoing first embodiment. For this reason, there is no AC component between the neutral point potential of the three-phase outputs and the potential of one side of the first DC power supply 2 and, therefore, it is possible to suppress a zero-phase-sequence current which may flow through the stray electrostatic capacitance 17 of the first DC power supply 2.

Additionally, since the plurality (two in this case) of single-phase inverters 4, 4a are connected in series with the AC output line of each phase of the three-phase three-level inverter 3, it is possible to decrease voltages output from the individual single-phase inverters 4, 4a, contributing to a reduction in switching loss. Also, if the number of the series-connected single-phase inverters 4, 4a is increased, it is possible to decrease the frequency of carrier waves, enabling a further reduction in switching loss.

It is to be pointed out that the aforementioned configuration may be such that one single-phase inverter 4 of the two series-connected single-phase inverters 4, 4a produces an output containing a few pulses or less per half cycle and only the other single-phase inverter 4a produces an output by high-frequency PWM control operation. In this case, the DC voltage of the single-phase inverter 4a which is controlled by PWM may be made lower than the DC voltage of the single-phase inverter 4.

Fifth Embodiment

Next, a power converting apparatus according to a fifth embodiment of the present invention is described with reference to the drawings.

Figure 10:
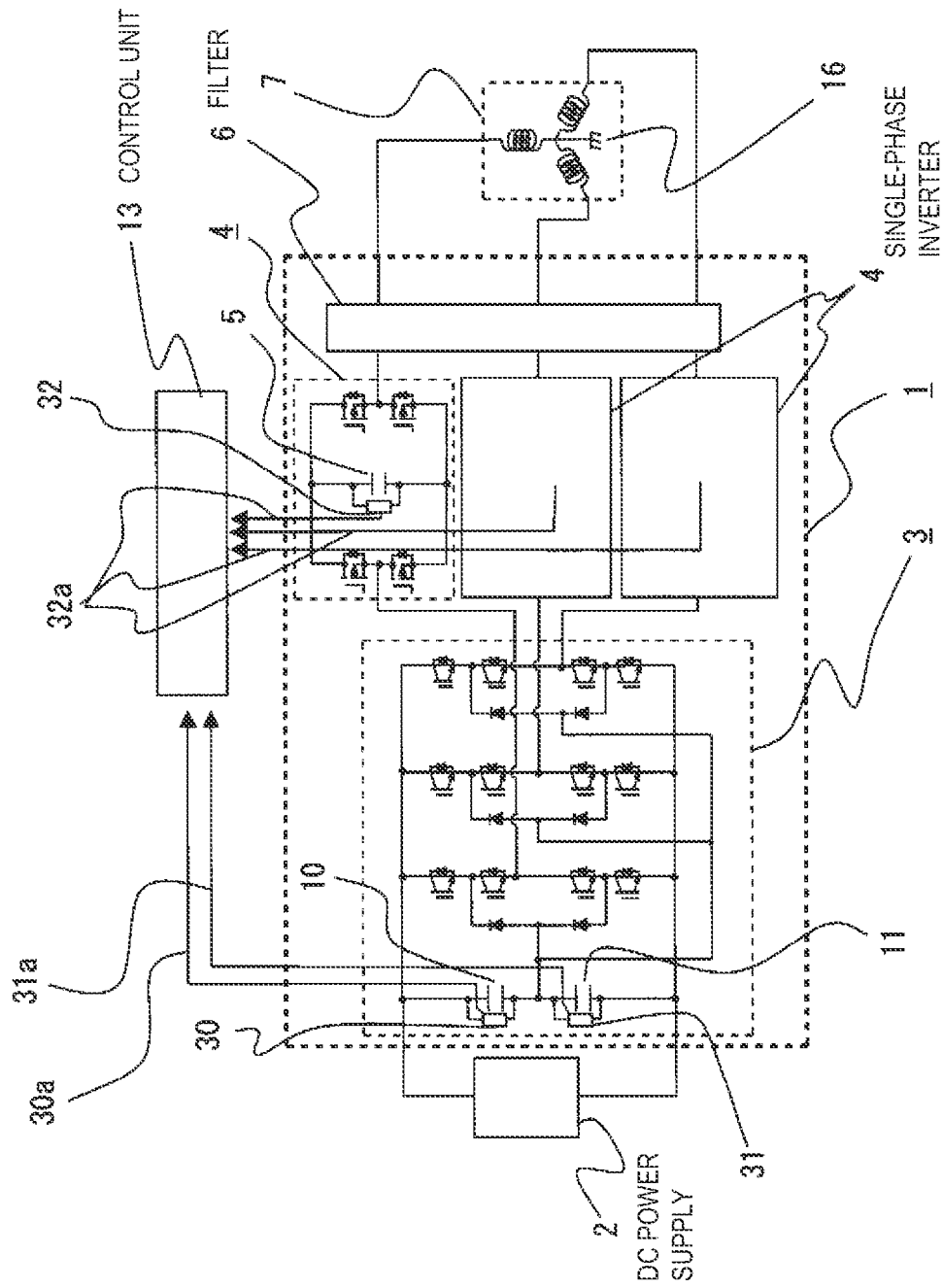
FIG. 10 is a diagram illustrating the configuration of a power converting apparatus according to a fifth embodiment of the present invention.

FIG. 10 is a diagram illustrating the configuration of the power converting apparatus according to the fifth embodiment of this invention. This embodiment includes a voltage sensor 30 provided parallel to a first series-connected capacitor 10 for measuring a voltage thereof, a voltage sensor 31 provided parallel to a second series-connected capacitor 11 for measuring a voltage thereof, and voltage sensors 32 provided for measuring voltages of DC capacitors 5 of individual single-phase inverters 4. Voltage values 30a-32a detected by these voltage sensors 30-32 are transmitted to an output control unit 13 and the output control unit 13 controls a three-phase three-level inverter 3 and the individual single-phase inverters 4.

The configuration of FIG. 10 is otherwise the same as the configuration of the foregoing first embodiment illustrated in FIG. 1.

Figure 11:
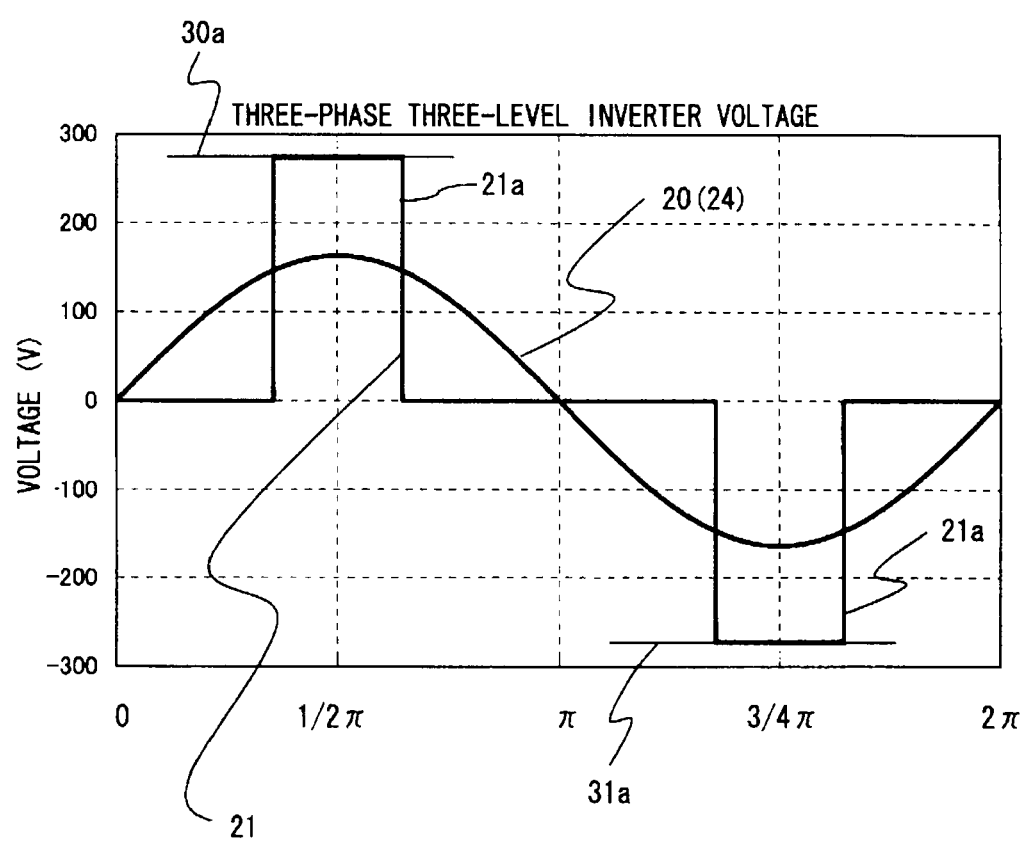
FIG. 11 is a voltage waveform diagram for explaining a comparative example of operation of a three-phase inverter circuit according to the fifth embodiment of the present invention.
Figure 12:
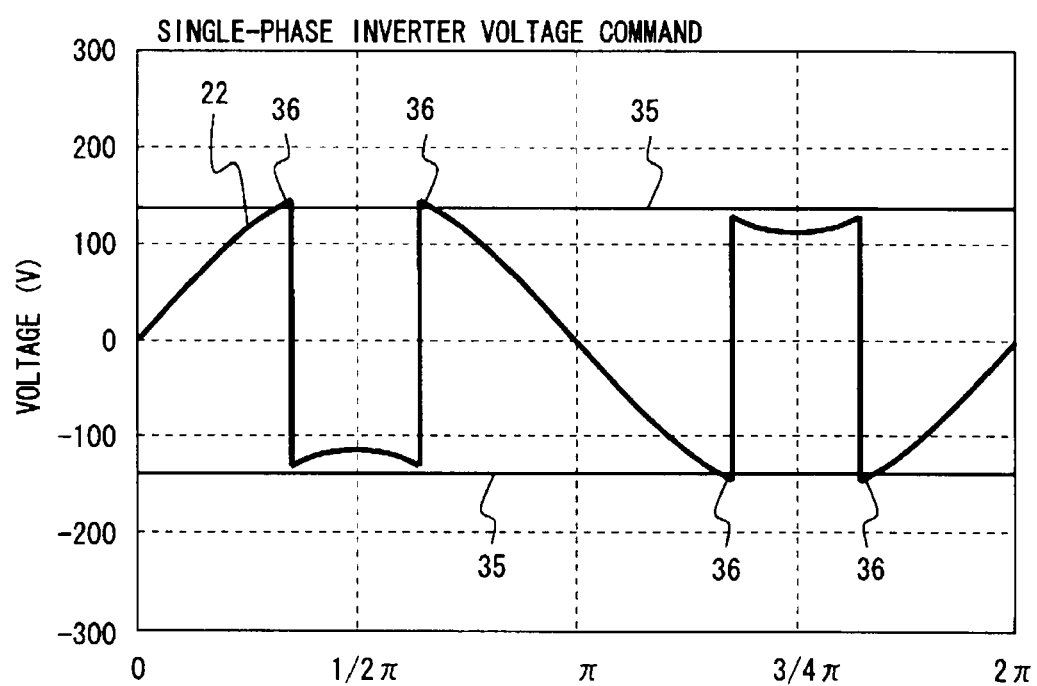
FIG. 12 is a voltage waveform diagram for explaining the comparative example of the operation of the three-phase inverter circuit according to the fifth embodiment of the present invention.
Figure 13:
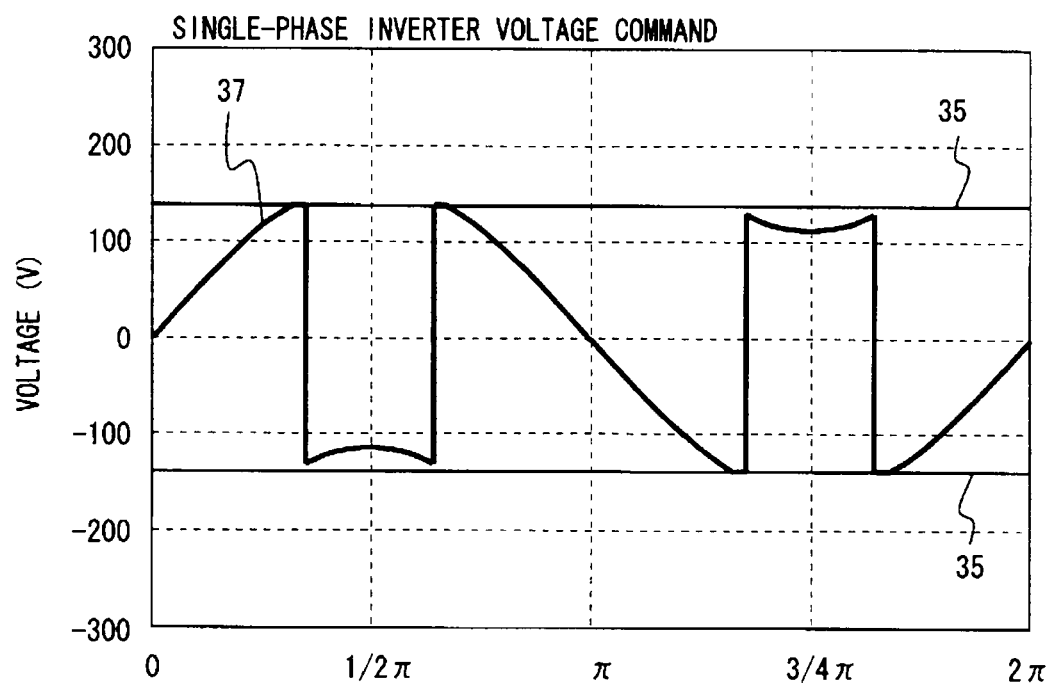
FIG. 13 is a voltage waveform diagram for explaining the operation of the three-phase inverter circuit according to the fifth embodiment of the present invention.
Figure 14:
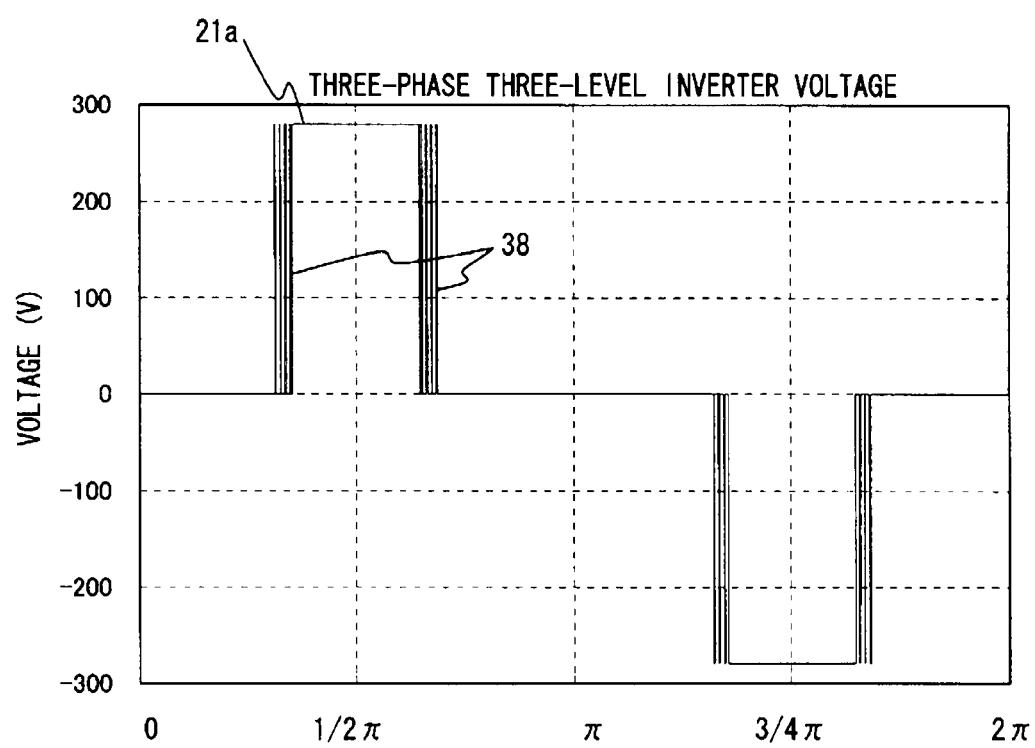
FIG. 14 is a voltage waveform diagram for explaining the operation of the three-phase inverter circuit according to the fifth embodiment of the present invention.

While the three-phase three-level inverter 3 outputs only one primary voltage pulse 21a per half cycle in the aforementioned first embodiment, the three-phase three-level inverter 3 operates in a different fashion in present fifth embodiment. FIGS. 11 to 14 are diagrams depicting voltage waveforms for explaining operation of a three-phase inverter circuit 1 according to the fifth embodiment. Individual potentials in the waveforms are potentials shown with reference to the neutral point, that is, the junction point between the first series-connected capacitor 10 and the second series-connected capacitor 11. It is to be noted that FIGS. 11 and 12 depict a comparative example while FIGS. 13 and 14 depict voltage waveforms of the three-phase inverter circuit 1 according to the fifth embodiment.

Depicted in FIG. 11 are a phase voltage command 20 (voltage waveform 24 of each phase) for the three-phase inverter circuit 1 and a voltage waveform output by each phase of the three-phase three-level inverter 3 provided that the power converting apparatus is caused to operate in the same fashion as in the above-described first embodiment. The voltage of each primary voltage pulse 21a output in the positive-going side of the phase voltage command 20 has the voltage value 30a of the first series-connected capacitor 10 and the voltage (absolute value) of each primary voltage pulse 21a output in the negative-going side of the phase voltage command 20 has the voltage value 31a of the second series-connected capacitor 11. Shown in FIG. 11 is a case where the voltage of the first DC power supply 2 is higher and the voltage values 30a, 31a of the first and second series-connected capacitors 10, 11 are higher than in a normal case depicted in FIG. 2.

Since the pulse width of each primary voltage pulse 21a is determined such that the power balance during half cycle or one cycle of the single-phase inverters 4 becomes zero as discussed in the foregoing, the pulse width becomes shorter as illustrated when a DC input voltage of the three-phase three-level inverter 3 increases.

FIG. 12 depicts an output voltage command (single-phase inverter voltage command 22) given to the single-phase inverter 4 when each phase of the three-phase three-level inverter 3 outputs a three-phase three-level inverter voltage 21 like the one depicted in FIG. 11. This single-phase inverter voltage command 22 is obtained by subtracting the three-phase three-level inverter voltage 21 of each phase from the phase voltage command 20 given to the three-phase inverter circuit 1.

While it is necessary for each single-phase inverter 4 to generate a differential voltage between the phase voltage command 20 given to the three-phase inverter circuit 1 and the three-phase three-level inverter voltage 21, this differential voltage increases when the voltage values 30a, 31a of the first and second series-connected capacitors 10, 11 increase and the pulse width of each primary voltage pulse 21a becomes shorter. For this reason, a voltage 36 exceeding an output voltage limit value 35 of each single-phase inverter 4 is required during individual periods at around a leading edge portion of each primary voltage pulse 21a and at around a trailing edge portion thereof as illustrated. Here, the magnitude of the output voltage limit value 35 is identical to the voltage value 32a of the DC capacitor 5 of each single-phase inverter 4.

FIG. 13 is a diagram depicting an output voltage command (single-phase inverter voltage command 37) given to each single-phase inverter 4 according to the present embodiment, and FIG. 14 depicts a voltage waveform (three-phase three-level inverter voltage) output from each phase of the three-phase three-level inverter 3 according to the present embodiment.

Since each single-phase inverter 4 can not output a voltage 36 exceeding the output voltage limit value 35 as shown in FIG. 12, the three-phase three-level inverter 3 is caused to generate shortages of output voltages of the single-phase inverters 4 as depicted in FIG. 14 during a period when the voltage 36 exceeding the output voltage limit value 35 is required. Specifically, the three-phase three-level inverter 3 outputs a partial PWM voltage 38 which is a voltage generated by PWM control operation during the periods at around the leading edge portion of each primary voltage pulse 21a and at around the trailing edge portion thereof in order to output amounts of voltage corresponding to the shortages of the output voltages of the single-phase inverters 4.

It is to be noted that the partial PWM voltage 38 is output according to the voltage values 30a, 31a of the first and second series-connected capacitors 10, 11 and the voltage value 32a of the DC capacitor 5. Specifically, in a case where voltage waveforms expressed by sine waves are obtained by only a combination of the primary voltage pulses 21a of the three-phase three-level inverter 3 and the output voltages of the single-phase inverters 4 because the voltages of the first and second series-connected capacitors 10, 11 are not so high or the voltages of the DC capacitors 5 are sufficiently high, the present embodiment employs the same control operation as in the foregoing first embodiment, and when necessary, the power converting apparatus is switched to a control operation capable of outputting the partial PWM voltage 38.

As discussed in the foregoing, it is made possible to output the partial PWM voltage 38 during the periods at around the leading edge portion and at around the trailing edge portion of each of the primary voltage pulses 21a which are output at a rate of one pulse per half cycle from the individual phases of the three-phase three-level inverter 3 in the present embodiment. For this reason, even when the voltage of either of the first and second series-connected capacitors 10, 11 increases as a result of an increase in the voltage of the first DC power supply 2, voltage waveforms having like sine waves to the phase voltage commands 20 are obtained. Therefore, the potential of the neutral point is stabilized and there is no fluctuation in a bus line potential of the first DC power supply 2 and, thus, desired voltage waveforms are obtained with high accuracy in a yet stabler fashion. Consequently, it is possible to reliably achieve suppression of a zero-phase-sequence current which may flow through the stray electrostatic capacitance 17 of the first DC power supply 2.

While the period during which the three-phase three-level inverter 3 outputs the partial PWM voltage 38 has been explained as the period during which the single-phase inverter 4 is required to produce the voltage 36 exceeding the output voltage limit value 35 in the above-described embodiment, the power converting apparatus is controlled in a below-described fashion to give some allowance in actuality. Specifically, the partial PWM voltage 38 is output during each period when a value obtained by subtracting the absolute value of a differential voltage between the phase voltage command 20 (output voltage waveform of each phase) and the three-phase three-level inverter voltage 21 made up of only the primary voltage pulse 21a from the voltage value 32a of the DC capacitor 5 becomes equal to or smaller than a specified value. This arrangement makes it possible to output the differential voltage between the phase voltage command 20 (output voltage waveform of each phase) and the three-phase three-level inverter voltage 21 made up of only the primary voltage pulse 21a in a reliable fashion and, thus, voltage waveforms having like sine waves to the phase voltage commands 20 are obtained.

Also, the pulse width of the primary voltage pulses 21a output from the three-phase three-level inverter 3 and the output period of the partial PWM voltage 38 are controlled in such a fashion that an output power balance during half cycle or one cycle of the aforementioned single-phase inverters becomes zero in this embodiment as well.

Furthermore, the individual single-phase inverters 4 may be controlled by feedback in such a manner that the voltage of the DC capacitor 5 of each single-phase inverter 4 matches the reference value by finely adjusting a voltage output period of the three-phase three-level inverter 3 as in the above-described third embodiment. In this case, the voltage output period of the three-phase three-level inverter 3 involves the pulse width of each primary voltage pulse 21a and the output period of the partial PWM voltage 38 and, thus, when the voltage value of any DC capacitor 5 is larger than the reference value, the voltage output period of the corresponding phase of the three-phase three-level inverter 3 is shortened, and when the voltage value of any DC capacitor 5 is smaller than the reference value, the voltage output period of the corresponding phase of the three-phase three-level inverter 3 is lengthened.

This arrangement makes it possible to control the power converting apparatus in such a manner as to cause the power balance to quickly return to zero even when the power balance during half cycle or one cycle of any of the individual single-phase inverters 4 deviates from zero in such an event that the power converting apparatus is switched between control operation performed by use of the primary voltage pulses 21a alone and control operation performed by generating the partial PWM voltage 38. For this reason, it is possible to prevent shortage of the output voltages of the single-phase inverters 4, overcharging of the DC capacitors 5, and insulation breakage of the single-phase inverters 4 caused by the overcharging, for instance, and this makes it possible to obtain a three-phase inverter circuit 1 whose outputs are stabilized.

Sixth Embodiment

Next, a power converting apparatus according to a sixth embodiment of the present invention is described with reference to the drawings.

Figure 15:
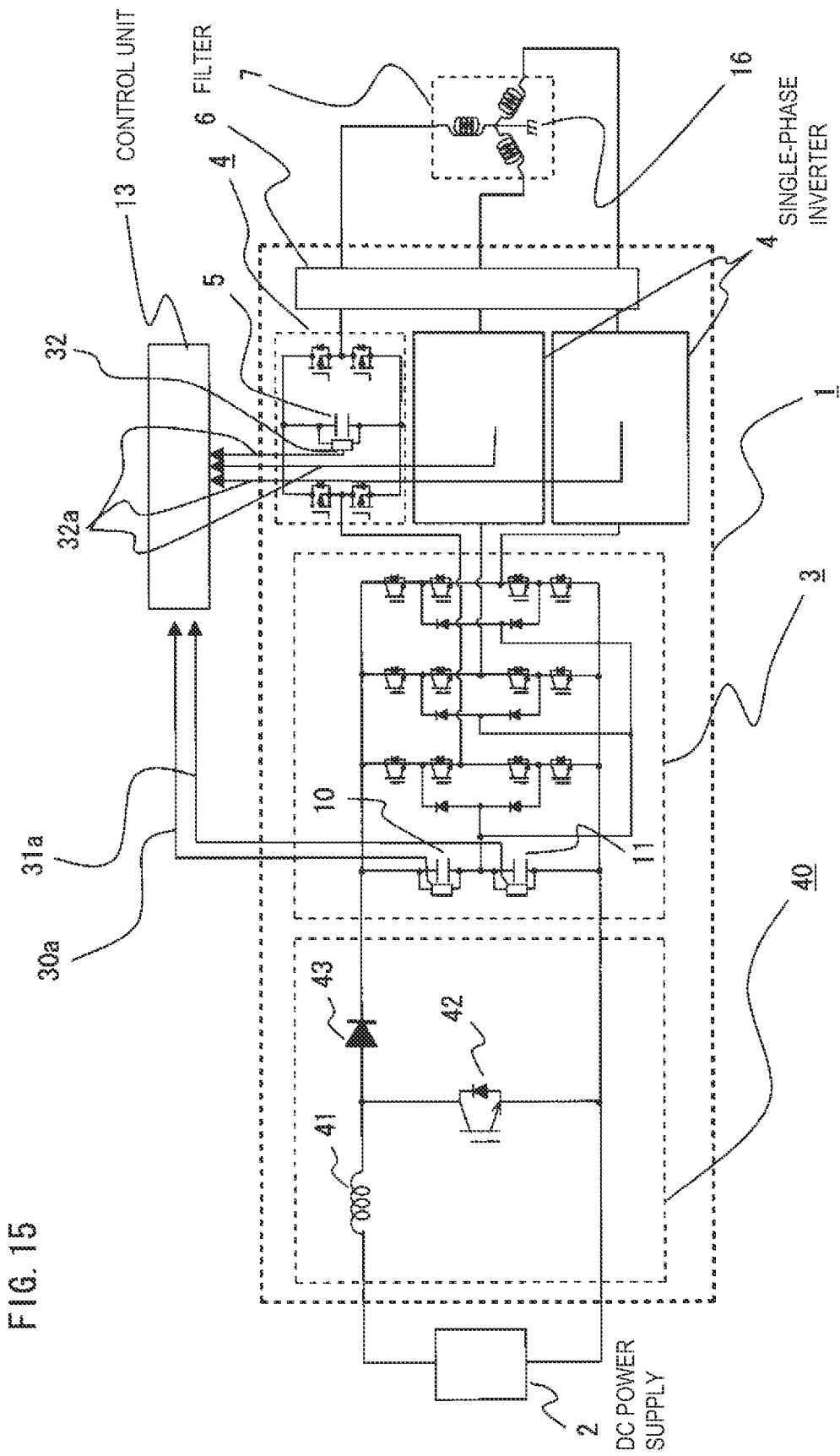
FIG. 15 is a diagram illustrating the configuration of a power converting apparatus according to a sixth embodiment of the present invention.

FIG. 15 is a diagram illustrating the configuration of the power converting apparatus according to the sixth embodiment of this invention. In this embodiment, a three-phase inverter circuit 1 includes a step-up circuit 40 for boosting a voltage of a first DC power supply 2, and an output voltage of the step-up circuit 40 is used as a DC input voltage of a three-phase three-level inverter 3. The step-up circuit 40 is configured with a reactor 41, a switch 42 connected between a high-voltage side bus line and a low-voltage side bus line of the first DC power supply 2 and a diode 43 for charging first and second series-connected capacitors 10, 11, for example.

The configuration of FIG. 15 is otherwise the same as the configuration of the foregoing fifth embodiment illustrated in FIG. 10, and the three-phase three-level inverter 3 and individual single-phase inverters 4 are controlled in the same fashion as in the foregoing fifth embodiment.

In a case where the first DC power supply 2 is a power supply which utilizes natural energy like a solar battery, an output voltage thereof constantly varies owing to weather changes, for instance. In the case of a solar battery, the output voltage thereof varies morning and night and under cloudy weather. An AC voltage that the three-phase three-level inverter 3 can output is determined by the voltage value 30a of the first series-connected capacitor 10 and the voltage value 31a of the second series-connected capacitor 11 which constitute a bus line voltage value of the three-phase three-level inverter 3.

Figure 16:
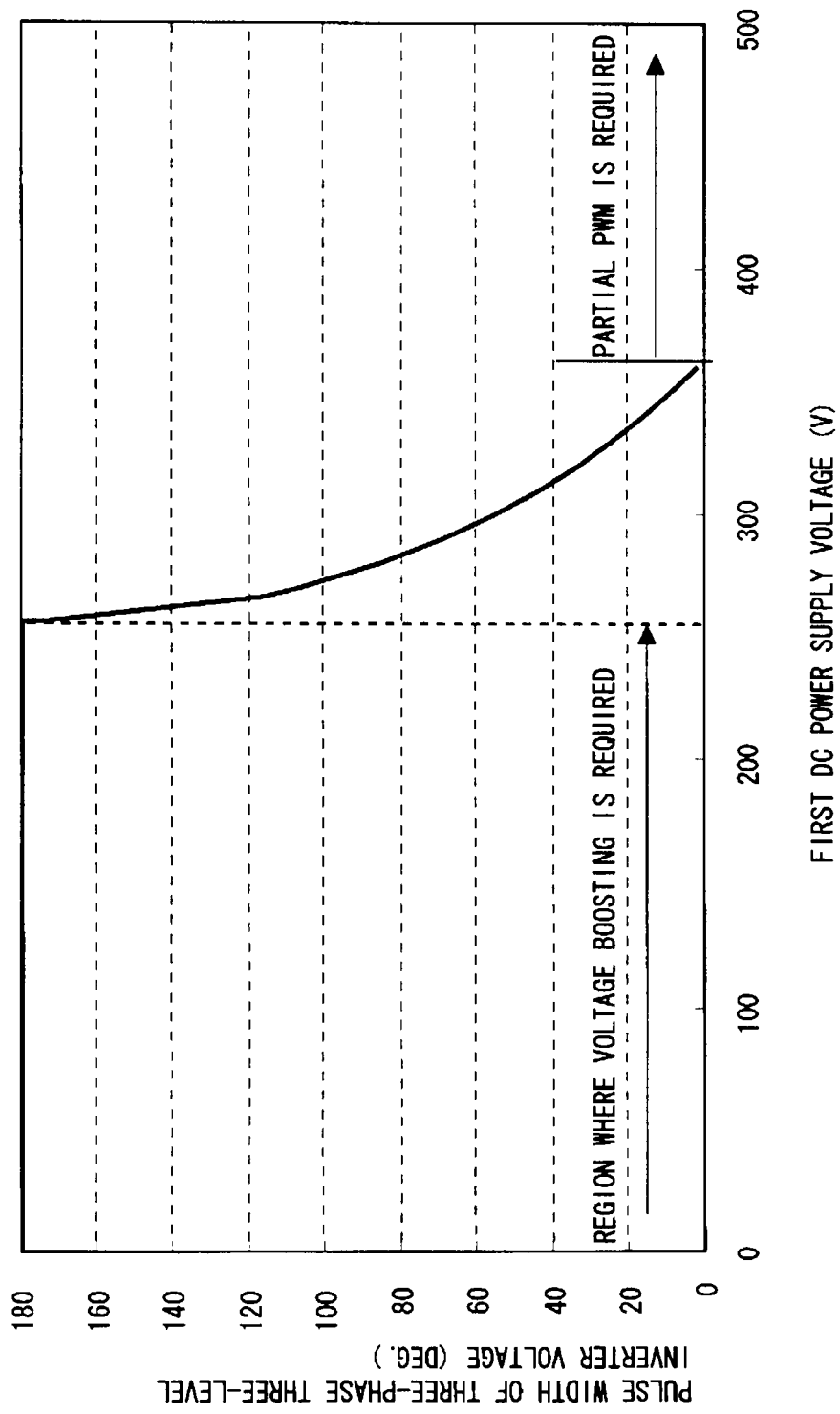
FIG. 16 is a diagram for explaining operation of a three-phase inverter circuit according to the sixth embodiment of the present invention.

FIG. 16 is a diagram depicting a relationship between the voltage of the first DC power supply 2 and the pulse width of the primary voltage pulses 21a output from the three-phase three-level inverter 3. Here, it is assumed that output voltages supplied to the load 7 are 200 Vrms and of three phases. When the voltage fed from the first DC power supply is a voltage lower than 256.51 V, this voltage is boosted up to 256.51 V by the step-up circuit 40 as shown in FIG. 16. When the voltage becomes equal to or higher than 256.51 V, the pulse width of the primary voltage pulses 21a is shortened, and when the voltage becomes equal to or higher than 362.7 V, the power converting apparatus is switched to control operation performed by outputting the partial PWM voltage 38.

In this embodiment, the voltage of the first DC power supply 2 is boosted so that the voltage value 30a of the first series-connected capacitor 10 and the voltage value 31a of the second series-connected capacitor 11 which together constitute the DC input voltage of the three-phase three-level inverter 3 are increased up to a voltage which makes it possible to output a desired AC voltage. For this reason, it becomes possible to cause the three-phase inverter circuit 1 to produce a waveform output from a situation in which the voltage of the first DC power supply 2 is low and, therefore, an operable range of the three-phase inverter circuit 1 is made broader.

While the present embodiment employs the control operation described in the foregoing fifth embodiment, it is possible to implement operation of any one of the foregoing first to fourth embodiments.

Seventh Embodiment

Next, a power converting apparatus according to a seventh embodiment of the present invention is described with reference to FIG. 17.

Figure 17:
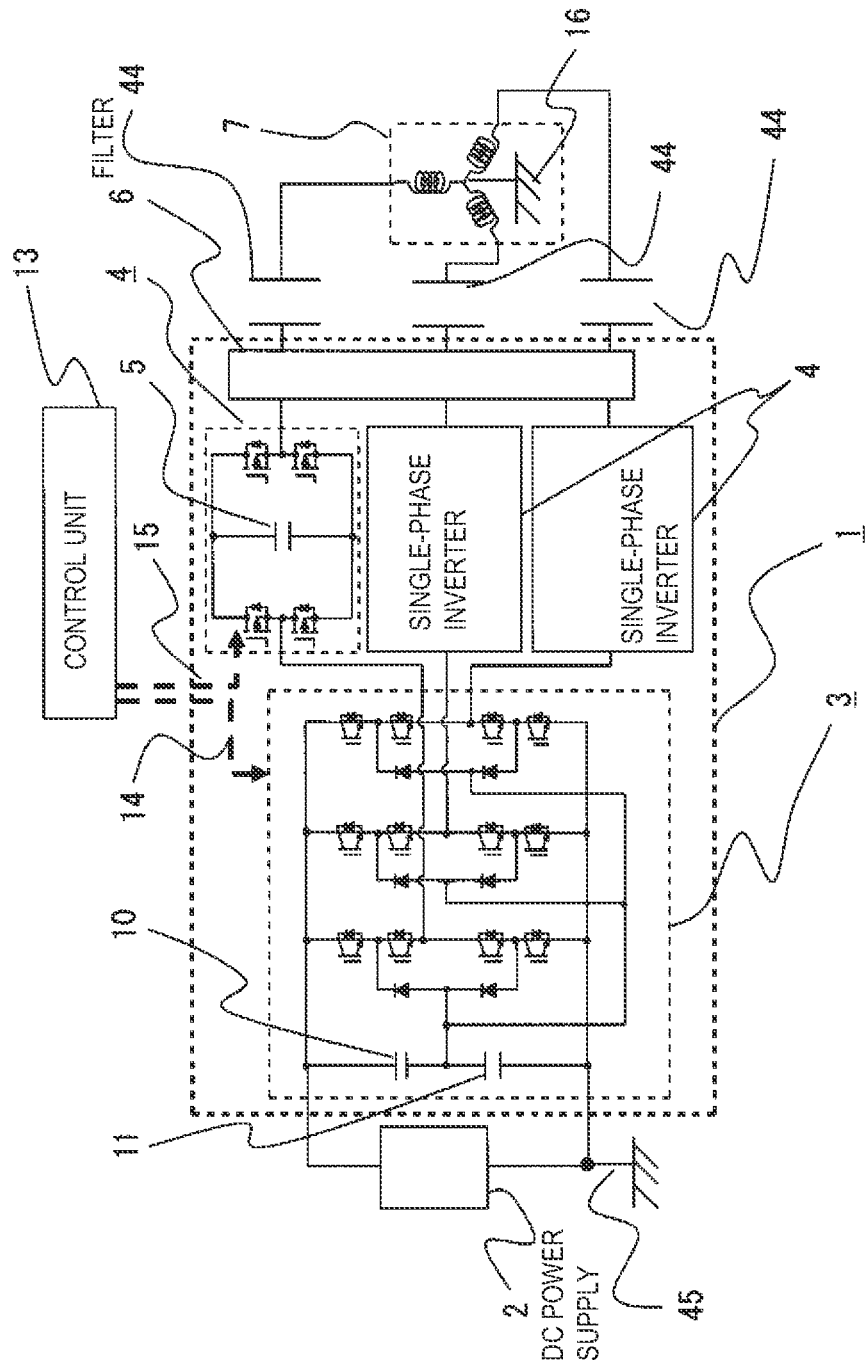
FIG. 17 is a diagram illustrating the configuration of a power converting apparatus according to a seventh embodiment of the present invention.

As shown in FIG. 17, there are provided capacitors 44 which are connected between outputs of individual phases of a three-phase inverter circuit 1 and a load 7 in series therewith, each of the capacitors 44 having a capacitance sufficient to store an electric charge of which quantity is equal to or larger than the quantity of electric charge output from the three-phase inverter circuit 1. A low-voltage side of output terminals of a first DC power supply 2 is grounded at a grounding point 45. While the configuration of FIG. 17 is otherwise the same as the configuration of the foregoing first embodiment illustrated in FIG. 1, the present embodiment may be applied to the other of the foregoing embodiments.

In the case where the first DC power supply 2 is grounded, output voltages of the individual phases of the three-phase inverter circuit 1 are output in such a fashion that the value of voltage equal to one half of the voltage of the first DC power supply 2 or the value of voltage of the second series-connected capacitor 11 becomes the value of a neutral point potential. Therefore, a waveform in which a corresponding DC voltage is added is output. In this embodiment, there are provided the capacitors 44 in the individual phases and, thus, these capacitors 44 cut DC components and only AC components are output to the load 7. Since the DC voltage components output to the load 7 are cut off in this fashion, it is possible to output voltages to a power system serving as the load 7 and thus interconnect the power converting apparatus to the power system.

Eighth Embodiment

Next, a power converting apparatus according to an eighth embodiment of the present invention is described with reference to FIG. 18.

Figure 18:
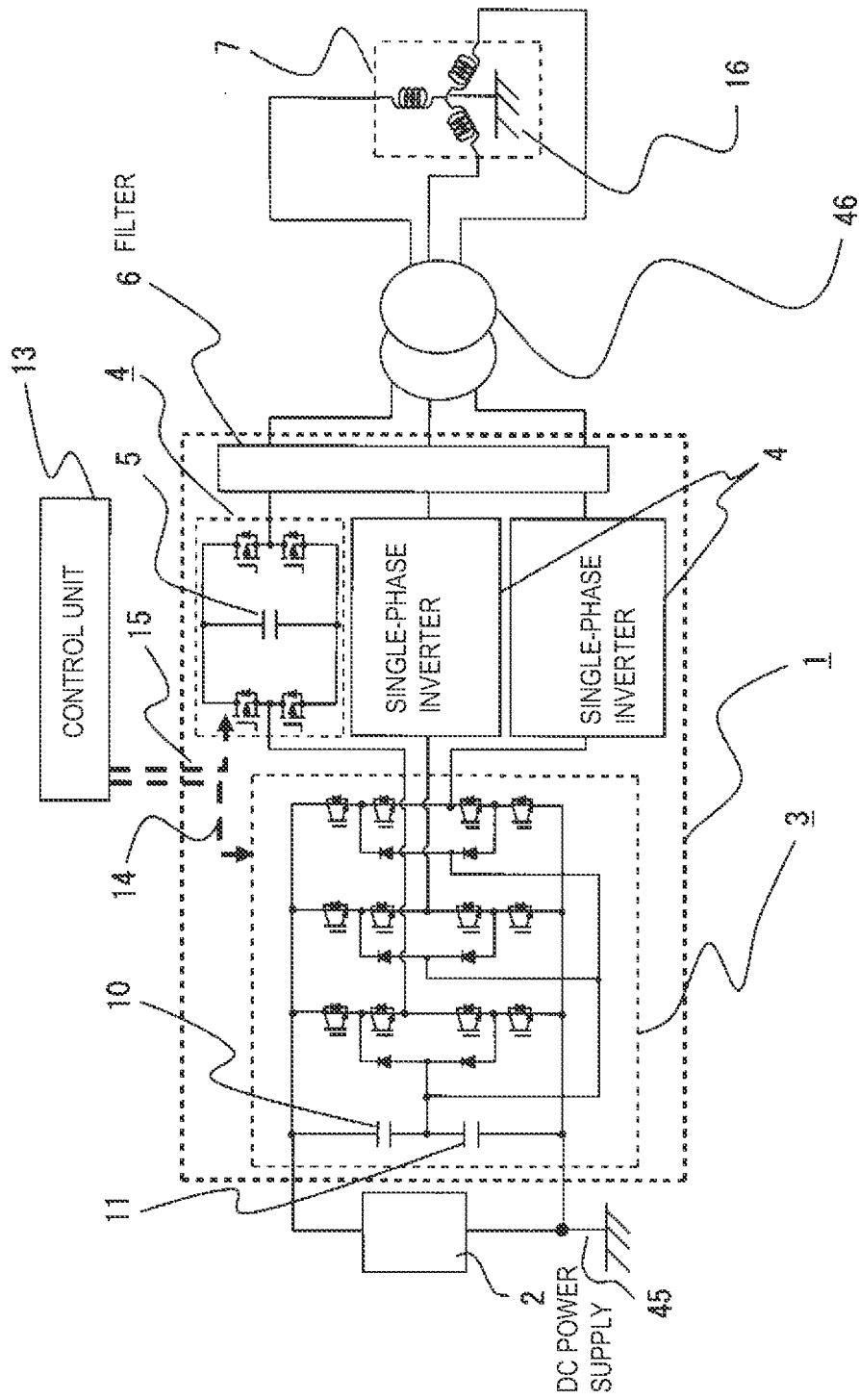
FIG. 18 is a diagram illustrating the configuration of a power converting apparatus according to an eighth embodiment of the present invention.

As shown in FIG. 18, there is disposed an insulating transformer 46 capable of providing insulation between a three-phase inverter circuit 1 and a load 7. A low-voltage side of output terminals of a first DC power supply 2 is grounded at a grounding point 45. The insulating transformer 46 may have a generally known voltage boosting function achieved in accordance with the ratio of numbers of windings. In this case, a zero-phase-sequence current path is interrupted and, therefore, no zero-phase-sequence current flows.

In the case where the first DC power supply 2 is grounded, output voltages of the individual phases of the three-phase inverter circuit 1 are output in such a fashion that the value of voltage equal to one half of the voltage of the first DC power supply 2 or the value of voltage of the second series-connected capacitor 11 becomes the value of a neutral point potential. Therefore, a waveform in which a corresponding DC voltage is added is output. In this embodiment, there is provided the insulating transformer 46 and, thus, DC components are cut off by the insulating transformer 46 and only AC components are output to the load 7. Since the DC voltage components output to the load 7 are cut off in this fashion, it is possible to output voltages to a power system serving as the load 7 and thus interconnect the power converting apparatus to the power system. Also, if the insulating transformer 46 performs the voltage boosting function, it is possible to output a high AC voltage.

The invention claimed is:

1. A power converting apparatus comprising:
a three-phase three-level inverter connected between positive and negative terminals of a first DC power supply,
one or a plurality of single-phase inverters which are connected in series with an AC output line of each phase of said three-phase three-level inverter, and a control device,
said power converting apparatus being configured such that the sums of output voltages of said three-phase three-level inverter and output voltages of said respective single-phase inverters are output to a load through a smoothing filter and a voltage of second DC power supplies, each of which is configured with a DC capacitor and which are DC input power supplies of said single-phase inverters, is lower than a one-level voltage of said three-phase three-level inverter; wherein:
said control device controls said three-phase three-level inverter in such a manner that each phase of said three-phase three-level inverter outputs a voltage at a rate of one pulse per half cycle of an output voltage to a corresponding phase of said load as a primary voltage pulse,
said control device controls a pulse width of the primary voltage pulse output by said three-phase three-level inverter such that an output power balance during half cycle or one cycle of said individual single-phase inverters becomes zero, and
said control device controls said individual single-phase inverters by (pulse width modulation) PWM so that output voltages supplied to individual phases of said load form sine waves of which phases are offset by $2\pi/3$ from one phase to another, the sine waves having the same peak value, and the output voltages supplied to the individual phases of said load being referenced to a point having a zero DC potential or a fixed DC potential with respect to a reference potential of said first DC power supply.

2. The power converting apparatus as recited in claim 1 further comprising two series-connected capacitors for dividing the voltage of said first DC power supply which is a DC input of said three-phase three-level inverter, wherein said three-phase three-level inverter is a neutral point clamped inverter having clamping diodes provided at a midpoint of said two series-connected capacitors for maintaining a fixed potential.

3. The power converting apparatus as recited in claim 1 wherein said individual single-phase inverters are controlled by PWM so that output currents supplied to the individual phases of said load form sine waves.

4. The power converting apparatus as recited in claim 1 wherein when a voltage value of any of said second DC power supplies of said individual single-phase inverters is larger than a reference value, said control device shortens the pulse width of the primary voltage pulse of a corresponding phase, and when the voltage value of any of said second DC power supplies is smaller than the reference value, said control device lengthens the pulse width of the primary voltage pulse of a corresponding phase.

5. The power converting apparatus as recited in claim 1, wherein said control device controls said three-phase three-level inverter by PWM during periods at around a leading edge portion of the primary voltage pulse and at around a trailing edge portion thereof.

6. The power converting apparatus as recited in claim 5 wherein the periods during which said three-phase three-level inverter is controlled by PWM are periods when a value obtained by subtracting the absolute value of a differential voltage between any of the output voltages supplied to the individual phases of said load and a phase voltage produced by the primary voltage pulse from a voltage value of any of said second DC power supplies becomes equal to or smaller than a specified value.

7. The power converting apparatus as recited in claim 5 wherein said control device controls a voltage output period of said three-phase three-level inverter determined by the pulse width of the primary voltage pulse output and PWM control operation in such a manner that an output power balance during half cycle or one cycle of said individual single-phase inverters becomes zero.

8. The power converting apparatus as recited in claim 7 wherein when a voltage value of any of said second DC power supplies of said individual single-phase inverters is larger than a reference value, said control device shortens the voltage output period of said three-phase three-level inverter of a corresponding phase, and when the voltage value of any of said second DC power supplies is smaller than the reference value, said control device lengthens the voltage output period of said three-phase three-level inverter of a corresponding phase.

9. The power converting apparatus as recited in claim 1, wherein one of output terminals of said first DC power supply is grounded and a capacitor is connected in series between each of said single-phase inverters and said load so as to cut off a DC voltage component output to each phase of said load.

10. The power converting apparatus as recited in claim 1, further comprising a step-up circuit for boosting the voltage of said first DC power supply and an output voltage of said step-up circuit is used as a DC input of said three-phase three-level inverter.

11. The power converting apparatus as recited in claim 1, further comprising an insulating transformer in an upstream stage of said load so that AC power is supplied to said load through said insulating transformer.

12. A power converting apparatus comprising:
a three-phase three-level inverter to be connected between positive and negative terminals of a first DC power supply;
one or more individual single-phase inverters connected in series with an AC output line of each phase of said three-phase three-level inverter;
a smoothing filter to output sums of output voltages of said three-phase three-level inverter and output voltages of said respective single-phase inverters to a load;
a second DC power supply, which is configured with a DC capacitor, included in each of the one or plurality of single-phase inverters, wherein a voltage of the second DC power supply is lower than a one-level voltage of said three-phase three-level inverter; and
a control device to control:
said three-phase three-level inverter in such a manner that each phase of said three-phase three-level inverter outputs a voltage at a rate of one pulse per half cycle of an output voltage to a corresponding phase of said load as a primary voltage pulse,
a pulse width of the primary voltage pulse output by said three-phase three-level inverter such that an output power balance during half cycle or one cycle of said individual single-phase inverters becomes zero, and
said individual single-phase inverters by (pulse width modulation) PWM so that output voltages supplied to individual phases of said load form sine waves of which phases are offset by $2\pi/3$ from one phase to another, the sine waves having the same peak value, and the output voltages supplied to the individual phases of said load being referenced to a point having a zero DC potential or a fixed DC potential with respect to a reference potential of said first DC power supply.

13. A power converting apparatus comprising:
a three-phase three-level inverter to be connected between positive and negative terminals of a first DC power supply;
one or more individual single-phase inverters connected in series with an AC output line of each phase of said three-phase three-level inverter;
a smoothing filter to output sums of output voltages of said three-phase three-level inverter and output voltages of said respective single-phase inverters to a load;
a second DC power supply, which is configured with a DC capacitor, included in each of the one or plurality of single-phase inverters, wherein a voltage of the second DC power supply is lower than a one-level voltage of said three-phase three-level inverter; and
controller means for controlling:
said three-phase three-level inverter in such a manner that each phase of said three-phase three-level inverter outputs a voltage at a rate of one pulse per half cycle of an output voltage to a corresponding phase of said load as a primary voltage pulse,
a pulse width of the primary voltage pulse output by said three-phase three-level inverter such that an output power balance during half cycle or one cycle of said individual single-phase inverters becomes zero, and
said individual single-phase inverters by (pulse width modulation) PWM so that output voltages supplied to individual phases of said load form sine waves of which phases are offset by $2\pi/3$ from one phase to another, the sine waves having the same peak value, and the output voltages supplied to the individual phases of said load being referenced to a point having a zero DC potential or a fixed DC potential with respect to a reference potential of said first DC power supply.

* * * * *